United States Patent
Grand et al.

(10) Patent No.: US 10,132,381 B2
(45) Date of Patent: Nov. 20, 2018

(54) DISENGAGEABLE DAMPING ASSEMBLIES FOR MOVING AERODYNAMIC SURFACES

(71) Applicant: Goodrich Actuation Systems SAS, Buc (FR)

(72) Inventors: Serge Grand, Villebon-sur-Yvette (FR); Serge Bloch, Meudon (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 594 days.

(21) Appl. No.: 14/639,283

(22) Filed: Mar. 5, 2015

(65) Prior Publication Data

US 2015/0252869 A1 Sep. 10, 2015

(30) Foreign Application Priority Data

Mar. 5, 2014 (EP) .................................. 14305311

(51) Int. Cl.
*F16F 15/03* (2006.01)
*B64D 45/00* (2006.01)
(Continued)

(52) U.S. Cl.
CPC ............ *F16F 15/035* (2013.01); *B64C 13/50* (2013.01); *B64D 45/00* (2013.01); *H02K 49/043* (2013.01); *B64D 2045/0085* (2013.01)

(58) Field of Classification Search
CPC ........ F16F 15/035; H02K 49/00–49/12; F16D 2121/18–2121/22
(Continued)

(56) References Cited

U.S. PATENT DOCUMENTS

| 3,246,269 A | 4/1966 | Packard |
| 2011/0254394 A1 | 10/2011 | Piaton |
| 2012/0038302 A1 | 2/2012 | Casimir et al. |

FOREIGN PATENT DOCUMENTS

| DE | 102010035084 A1 | 2/2012 |
| JP | H0274146 A | 3/1990 |

(Continued)

OTHER PUBLICATIONS

EP Search Report for Application No. 14305311.4-1755, dated Aug. 29, 2014, 7 Pages.
(Continued)

*Primary Examiner* — Ramon M Barrera
(74) *Attorney, Agent, or Firm* — Cantor Colburn LLP

(57) ABSTRACT

A damping assembly is described herein for use in a device having moving aerodynamic surfaces including a first component comprising a back iron and at least one permanent magnet, said at least one permanent magnet providing a first magnetic field, and an electrically conductive second component, said electrically conductive second component and said first component being positioned coaxially about a central axis with said at least one permanent magnet being positioned between said back iron of said first component and said electrically conductive second component; the assembly further comprising means for rotating one or both of said at least one permanent magnet of said first component and said electrically conductive second component about said central axis to cause relative rotational movement between the at least one permanent magnet and second component, to thereby induce a variable magnetic flux in said electrically conductive second component and cause eddy currents to develop.

13 Claims, 1 Drawing Sheet

(51) Int. Cl.
*B64C 13/50* (2006.01)
*H02K 49/04* (2006.01)

(58) Field of Classification Search
USPC .................. 188/161–165, 267; 310/104–110
See application file for complete search history.

(56) References Cited

FOREIGN PATENT DOCUMENTS

| | | |
|---|---|---|
| JP | H09328098 A | 12/1997 |
| JP | 2002142442 A | 5/2002 |
| JP | 2002272193 A | 9/2002 |
| JP | 2004153936 A | 5/2004 |
| JP | 2009130951 A | 6/2009 |

OTHER PUBLICATIONS

Japanese Patent Office Action for Patent Application 2015-032395, dated Aug. 14, 2018. (Translation) 3 pages.
Japanese Patent Office Action for Patent Application 2015-032395, dated Aug. 14, 2018. 5 pages.

DISENGAGEABLE DAMPING ASSEMBLIES FOR MOVING AERODYNAMIC SURFACES

CROSS REFERENCE TO RELATED APPLICATIONS

This application claims priority to European Patent Application No. 14305311.4 filed Mar. 5, 2014, the entire contents of which is incorporated herein by reference.

TECHNICAL FIELD

The damping methods, mechanisms and assemblies described herein may be used to damp moving aerodynamic surfaces such as those found in various mechanical or electromechanical devices, such as actuators or motors. In some examples, the damping assemblies described herein may also be used in aeronautical applications for the damping of flight control surfaces such as ailerons or airfoils, which in certain configurations may be the site of vibrations known as flutter.

BACKGROUND

For hydraulic cylinders, the damping effect is obtained by utilizing flow restriction through orifices in the bypass between the chambers. The electro-hydraulic actuator control is enabled by an inherently safe mode valve. When a voltage is applied to the valve no damping effort is generated. When the voltage is released or in case of failure, the valve mode switches to damping mode under operation of a spring making the fluid pass through the restriction.

Known methods of damping of moving aerodynamic surfaces in mechanical or electromechanical devices such as motors or actuators etc. often require the use of additional, and often, complex, electronic circuitry, which can complicate a device.

Damping in mechanical or electromechanical devices having moving aerodynamic surfaces is mandatory to prevent catastrophic flutter oscillations in case of actuator or power supply failure or loss of control. For an electromechanical actuator, this damping effect is provided by generating a reverse torque that is proportional to the position rate of the actuator.

US 2012/0038302 A1 aims to provide a damping solution that can be used in a motor power supply circuit for powering an electric motor that may be used, for example, for actuating a movable air foil of an aircraft. In such situations, two electric motors and two power supplies are connected to the airfoil and are used in a redundant scheme such that in the event of one of the motors failing, the other motor can be used as a replacement. The power supply circuit described in this document comprises an active mode, in which it powers the motor, and a passive mode, in which it provides damping by switching the motor phases across a bank of three damping resistors. The design is based on naturally closed power switching devices so that when the power supply circuit is in active mode, no current flows through the damping resistors while, when the power supply is lost, the windings of the motor are connected to the damping resistors.

US 2011/0254394 A1 describes a supplemental damping effect for an electric motor that is described as being analogous to the damping resulting from the use of a hydraulic cylinder, however, in contrast to what is achieved for a hydraulic cylinder, the damping effect is always available in all circumstances, without the intervention of any device. The damping effect described in this document filters out vibrations originating directly from the mechanism maneuvered by the electric motor. The electric motor consists of a rotor fitted with permanent magnets and comprises a stator, the stator of which is made up of two parts: a stack of laminations forming round teeth and a solid tube-shaped field frame made of a material of the stainless steel kind, enveloping the stack of laminations. The stainless steel constitutes a poor magnetic circuit, with losses through eddy currents and hysteresis. These losses therefore offer braking and damping.

SUMMARY

A damping assembly is described herein for use in a device having moving aerodynamic surfaces comprising: a first component comprising a back iron and at least one permanent magnet, said at least one permanent magnet providing a first magnetic field; and an electrically conductive second component, said electrically conductive second component and said first component being positioned coaxially about a central axis with said at least one permanent magnet being positioned between said back iron of said first component and said electrically conductive second component; the assembly further comprising means for rotating one or both of said at least one permanent magnet of said first component and said electrically conductive second component about said central axis to cause relative rotational movement between the at least one permanent magnet and second component, to thereby induce a variable magnetic flux in said electrically conductive second component and cause eddy currents to develop therein.

The at least one permanent magnet may extend along a radial axis from said back iron of said first component in the direction of said electrically conductive second component.

In some examples, the back iron of the first component may be ring-shaped and said second component may be positioned within said ring-shaped back iron of the first component and said at least one permanent magnet may extend along a radial axis inward from an inner circumferential surface of the back iron and towards an outer circumferential surface of the electrically conductive second component.

In some examples, the second component may be ring-shaped and the first component may be positioned within said ring-shaped second component and said at least one permanent magnet may extend along a radial axis outward from an outer circumferential surface of said back iron and towards an inner circumferential surface of the ring-shaped electrically conductive second component.

In some examples, the assembly may further comprise a second, external, ring-shaped back iron and said first component and said second component may be positioned within said second, external, ring-shaped back iron.

In some examples, the second, ring-shaped external back iron may be coupled to said second component so that upon rotation of said second component about said central axis of rotation said external back iron also rotates.

In any of the examples described herein, the damping assembly may further comprise means for reducing said first magnetic field of said at least one permanent magnet.

In some examples, the means for reducing said first magnetic field of said at least one permanent magnet may comprise at least one conductive coil wound coaxially with said at least one permanent magnet; and may further comprise means for causing a current to flow through said at least one conductive coil, to create a second magnetic field that is opposite to said first magnetic field of said at least one permanent magnet, to thereby cancel the first magnetic field of said at least one permanent magnet.

In some examples described herein, the at least one permanent magnet may extend from said back iron along a radial axis; and said means for reducing said first magnetic field may comprise at least one conductive coil wound about said radial axis. The assembly may further comprise means for causing a current to flow through said at least one conductive coil, to create a second magnetic field that is opposite to said first magnetic field of said at least one permanent magnet, to thereby cancel the first magnetic field of said at least one permanent magnet.

In some examples described herein, said first component may comprise a stator and said second component may comprise a rotor body. The means for rotating one or both of said at least one permanent magnet of said first component and said electrically conductive second component about said central axis to cause relative rotational movement between the at least one permanent magnet and second component may further comprise means for rotating said second component about said central axis.

The damping assemblies described herein may be connectable to the device to be damped via a shaft which extends along said central axis of rotation.

The device to be damped may comprise a motor and said damping assembly may be connectable to said motor via a shaft of said motor which extends along said central axis of rotation.

A method of damping moving aerodynamic surfaces of a device is also described herein comprising: providing a first component comprising a back iron and at least one permanent magnet, said at least one permanent magnet providing a first magnetic field; and providing an electrically conductive second component, positioning said first component and said electrically conductive second component coaxially about a central axis with said at least one permanent magnet being positioned between said back iron of said first component and said electrically conductive second component; said method further comprising the step of rotating one or both of said first component and said electrically conductive second component about said central axis to cause relative rotational movement between the first and second components to thereby induce a variable magnetic flux in said electrically conductive second component and cause eddy currents to develop therein.

The methods described herein may comprise the step of providing at least one permanent magnet that extends along a radial axis from said back iron of said first component in the direction of said electrically conductive second component.

In some examples, the back iron of the first component may be ring-shaped and the methods described herein may comprise the step of positioning the second component within said ring-shaped back iron of the first component with said at least one permanent magnet extending along a radial axis inward from an inner circumferential surface of the ring-shaped back iron and towards an outer circumferential surface of the electrically conductive second component.

In some examples, the second component may be ring-shaped and the methods described herein may comprise the step of positioning the first component within said ring-shaped second component with said at least one permanent magnet extending along a radial axis outward from an outer circumferential surface of said back iron and towards an inner circumferential surface of the electrically conductive second component.

In some examples, the methods described herein may comprise the step of providing a second, external, ring-shaped back iron and positioning said first component and said second component within said second, external, ring-shaped back iron. In some examples, the methods described herein may comprise the step of coupling the second, external ring-shaped back iron to said second component so that upon rotation of said second component about said central axis of rotation said external back iron also rotates.

The methods described herein may comprise the step of reducing said first magnetic field of said at least one permanent magnet.

In some examples, the step of reducing said first magnetic field of said at least one permanent magnet may comprise coaxially winding at least one conductive coil with said at least one permanent magnet; and causing a current to flow through said at least one conductive coil, to create a second magnetic field that is opposite to said first magnetic field of said at least one permanent magnet, to thereby cancel the first magnetic field of said at least one permanent magnet.

In some examples, the methods described may comprise the step of positioning the at least one permanent magnet so that it extends from said back iron along a radial axis; and may further comprise the step of reducing said first magnetic field by winding at least one conductive coil about said radial axis and causing a current to flow through said at least one conductive coil, to create a second magnetic field that is opposite to said first magnetic field of said at least one permanent magnet, to thereby cancel the first magnetic field of said at least one permanent magnet.

In some examples described herein, the step of rotating one or both of said at least one permanent magnet of said first component and said electrically conductive second component about said central axis to cause relative rotational movement between the at least one permanent magnet and second component may further comprise the step of rotating said second component about said central axis. In some examples, the first component may remain stationary while the second component rotates. In other examples, both the first and second component may rotate at different speeds to each other.

The methods described herein may comprise the step of connecting the damping assembly to the device to be damped via a shaft which extends along said central axis of rotation.

The methods described herein may comprise the step of connecting the damping assembly to a motor to be damped via a shaft of said motor which extends along said central axis of rotation.

In any of the examples described herein, the first component and the second component may be ring shaped.

In any of the examples described herein, the damping assembly may further comprise an air gap between the at least one permanent magnet and the second component.

In any of the examples described herein, the back iron of said first component may comprise a soft magnetic iron.

In any of the examples described herein the back iron of said first component may comprise silicon iron laminations.

In any of the examples described herein, the electrically conductive second component may comprise a magnetic stainless steel.

In any of the examples described herein the electrically conductive second component may comprise X3CrTi17.

In any of the examples and methods described herein, the assembly and methods may further comprise a plurality of permanent magnets. Each of these permanent magnets may further provide a magnetic field and the assembly may further comprises means for reducing some, or all, of the magnetic fields of the permanent magnets.

In some examples, the first component may be stationary and may therefore be referred to as a stator, whilst the electrically conductive second component rotates relative to the first component, and about the central axis of rotation and may therefore be referred to as a rotor.

In some examples, the damping assembly may comprise means for rotating said electrically conductive second component about said axis of rotation relative to said at least one magnet of said first component, said at least one permanent magnet being positioned relative to said electrically conductive second component so as to induce a variable magnetic flux in said electrically conductive second component as the second component is rotated.

In some examples described herein, the first component may comprise a plurality of said permanent magnets extending therefrom in the direction of said electrically conductive second component; each permanent magnet providing a magnetic field; and may further comprise means for rotating said electrically conductive second component about said axis of rotation and through said magnetic fields to thereby induce a variable magnetic flux in said electrically conductive second component and cause eddy currents to develop therein.

In some examples, the first and second components may be ring-shaped and the electrically conductive second component may be positioned within said first component, whereas in other examples, the first component may be positioned within said electrically conductive second component. In some examples, the first component may be positioned within said electrically conductive second component so that said permanent magnets extend radially outward from said first component in the direction of said surrounding electrically conductive second component. In some other examples, the electrically conductive second component may be positioned within said first component so that said permanent magnets extend radially inward from said first component in the direction of said electrically conductive second component.

DETAILED DESCRIPTION

Improved damping mechanisms and assemblies are described herein that may be used to damp moving aerodynamic surfaces. In particular, the damping assemblies described herein may be used to damp the moving aerodynamic surfaces of mechanical or electromechanical devices such as actuators or motors. In some examples, the damping assemblies described herein may also be used in aeronautical applications for the damping of flight control surfaces such as ailerons or airfoils, which in certain configurations may be the site of vibrations known as flutter. The examples described herein may damp the actuator that is driving the movement of the aerodynamic surfaces and/or damp the moving aerodynamic surface itself.

The damping assemblies described herein may be attached or connected to an existing mechanical or electromechanical device such as an actuator or a motor, to create a damping effect on the moving aerodynamic surfaces of the actuator or motor. In such examples, the damping assemblies described herein can be attached to the motor or actuator via a shaft that is positioned along the same axis of rotation 15 as the damping assembly. The damping assemblies may be mounted on the same shaft around/upon which the motor to be damped is provided. The mechanisms described herein may also be used in combination with any other devices that may require such damping effects.

The examples described herein further provide damping methods, assemblies or mechanisms that have the advantageous feature of being disengageable, so as to reduce, or switch off, the damping effect, in different modes of operation, as required.

Figure 1:
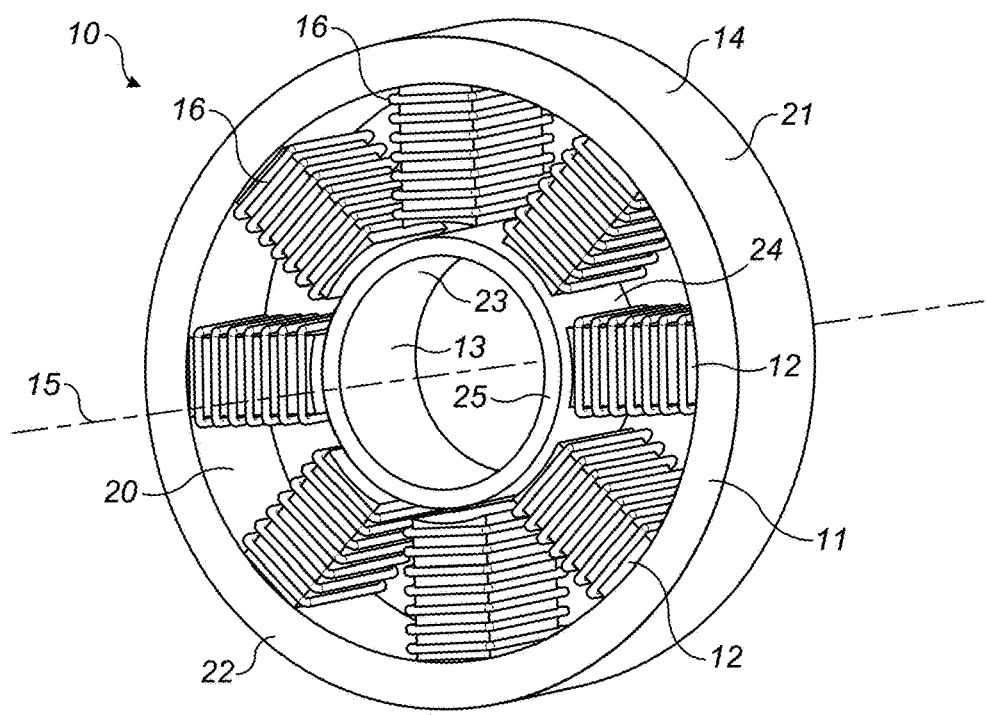
FIG. 1 shows a first example of a damping assembly for a device having moving aerodynamic surfaces.

A first example of a damping assembly 10 or mechanism is shown in FIG. 1. The damping assembly comprises a first component 11 which comprises an external cylindrical, or ring-shaped, back iron 14 fitted with radial permanent magnets 12. The ring-shaped back iron may be made from a soft magnetic iron, for example, silicon iron laminations. Other soft magnetic irons may alternatively be used. The external back iron 14, of the first component completes the magnetic circuit and closes the magnetic field lines.

In this example, the ring-shaped back iron 14 of the first component 11 may be described as having an inner circumferential surface 20 and an outer circumferential surface 21 and a radial wall 22 having a thickness defined by a radial distance between the inner 21 and outer 22 circumferential surfaces extending between the inner and outer circumferential surfaces. The permanent magnets 12 in this example extend from the inner circumferential surface 20 of the ring-shaped back iron 14 along a radial axis (i.e. that is generally perpendicular to the central axis of rotation 15). In the example shown in FIG. 1, a total of eight permanent magnets are provided. Other arrangements may also be used, that have more, or fewer, permanent magnets 12; however, at least one permanent magnet is required. In this example, the permanent magnets extend radially inward from the inner circumferential surface 20 of the ring-shaped back iron 14 of the first component and towards the central axis 15 of the assembly 10.

Figure 2:
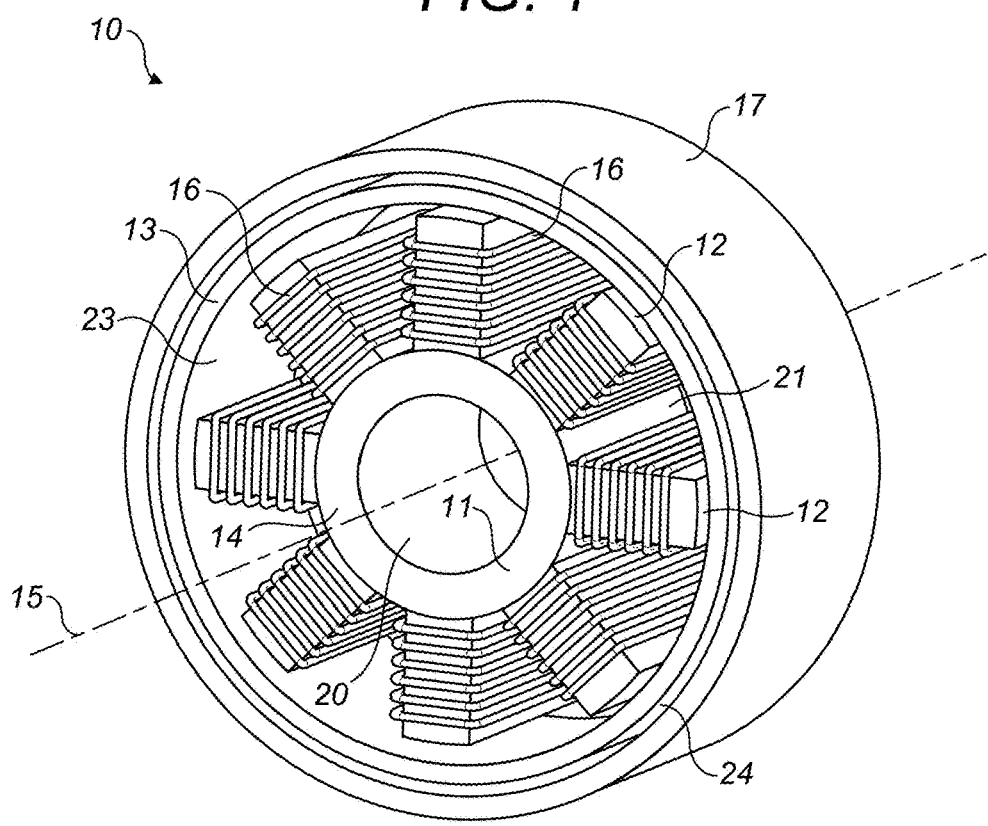
FIG. 2 shows a second example of a damping assembly for a device having moving aerodynamic surfaces.

The assembly 10 further comprises an electrically conductive second component 13 which, in the examples of FIGS. 1 and 2, is a conductive sleeve, which is also ring-shaped and which is positioned coaxially with the central axis 15 of the ring-shaped first component. The electrically conductive second component 13 may also be described as having an inner circumferential surface 23 and an outer circumferential surface 24 and a radial wall 25 having a thickness defined by a radial distance between the inner 23 and outer 24 circumferential surfaces. The second component 13 should ideally have two main characteristics. Firstly, it should be magnetically soft to complete the magnetic circuit and close the magnetic field lines. Secondly, the second component should be electrically conductive to thereby let eddy currents flow. The electrically conductive second component could therefore be comprised of magnetic stainless steels such as X3CrTi17, amongst other materials having similar properties.

A further alternative may be to provide an electrically conductive second component 13 that is manufactured in two concentric parts, with a first ring made of soft magnetic material (to complete the magnetic circuit and close the magnetic field lines) and a second conductive ring (e.g. copper) located on the magnet side to let the eddy currents flow, as described later.

The first component 11 and the electrically conductive second component 13 are positioned coaxially about a central axis with the at least one permanent magnet 12 being positioned between the back iron 14 of said first component 11 and the electrically conductive second component 13.

The relative sizes of the two components are chosen so that there remains an air gap between the at least one permanent magnet 12 and the electrically conductive second component 13, as can be seen in the figures. This gap is necessary for the relative rotation of the two components about the central axis, as described below.

In detail, in the example shown in FIG. 1, the back iron of the first component is ring-shaped and the second component 13 is positioned within the ring-shaped first component 11 so that the permanent magnets 12 are positioned between the inner circumferential surface 20 of the back iron 14 and the outer circumferential surface 24 of the ring shaped electrically conductive second component 13 with a small air gap therebetween.

The damping effect in this example may be achieved by rotating one or both of said at least one permanent magnet of said first component and said electrically conductive second component about said central axis to cause relative rotational movement between the at least one permanent magnet and second component. Due to this relative rotational movement, the electrically conductive second component 13 passes through the magnetic fields of the permanent magnets 12, which thereby induces a varying magnetic flux in the second component. This, in turn, causes eddy currents to develop in the second component.

In one example, the electrically conductive second component 13 may comprise a rotary conductive sleeve (i.e. a rotor), which is coaxially rotatable relative to the first component 11 and which rotates about the central axis 15 while the first component 11 comprising the magnets remains stationary (i.e. a stator). Due to the rotation of the electrically conductive second component 13 relative to the magnets of the first component 11 the electrically conductive second component 13 passes through the magnetic fields provided by the permanent magnets 12 as it rotates. This induces a varying magnetic flux through the electrically conductive second component 13 thereby causing eddy currents to develop therein. The eddy currents flow in such a way as to oppose the varying flux in the electrically conductive second component 13, thereby creating a reverse torque that is related to the rotation speed and thus producing the desired damping effect. As the speed of rotation increases, so does the amount of torque produced. Conversely, as the speed of rotation decreases, so does the amount of torque produced.

The coefficient of damping (Nm per mechanical rpm) can be adjusted by changing various design parameters including sleeve radial thickness and length, sleeve material, number and size of magnets, air gap dimension, etc.

A further example of a damping assembly similar to that shown in FIG. 1 is shown in FIG. 2. This device works in the same way and according to the exact same principles as that described and shown in FIG. 1, (and so the same reference numerals are used as in FIG. 1 to depict the same features); however, in this example, the electrically conductive second component 13 is provided in an outer position relative to the first component (as opposed to being in the centre of the assembly and within the first component 11 as is the case for FIG. 1).

In this example, the first component 11 again comprises a back iron 14, albeit an internal back iron 14, and at least one permanent magnet 12. The first component 11 is positioned within the ring-shaped electrically conductive second component 13 and the permanent magnets 12 extend along a radial axis outward from the outer circumferential surface 21 of the ring-shaped internal back iron 14 and towards the inner circumferential surface of the electrically conductive second component 13. Again, an air gap is provided between the permanent magnets 12 and the inner circumferential surface 23 of the second component 13.

The ring-shaped electrically conductive second component 13 is again positioned coaxially with the central axis of the ring-shaped first component 11 so that a varying magnetic flux is induced in the electrically conductive second component 13 as the magnets of the first component and/or electrically conductive second component are rotated relative to each other about the central axis 15.

As described with reference to the example of FIG. 1, in one example, the electrically conductive second component 13 may comprise a rotary conductive sleeve (i.e. a rotor), which is coaxially rotatable relative to the first component 11 and which rotates about the central axis 15 while the first component 11 remains stationary (i.e. a stator). Due to the rotation of the outer electrically conductive second component 13 relative to the inner first component 11, the electrically conductive second component 13 passes through the magnetic fields provided by the permanent magnets 12 as it rotates, resulting in the damping effect described earlier.

In this example, an external back iron, 17, is also provided which is also cylindrical or ring-shaped and which surrounds both the first 11 and second 13 components. In the examples described herein, the external back iron, (reference 14 in FIG. 1 and reference 17 in FIG. 2) may be stationary, or it may also rotate. The design of the example of FIG. 2, however, is simpler and more thermally sound if the external back iron 17 and the electrically conductive second component 13 sleeve are formed as, or comprise, a single part. The specific arrangement of FIG. 2 wherein the electrically conductive second component is in an outer position also has advantages in that it facilitates heat exchange from the sleeve 13 to the external environment.

The examples shown in FIGS. 1 and 2 further comprise means for reducing, disengaging, or deactivating the damping assembly and resulting effect. This comprises means for reducing or cancelling the effect of the permanent magnets (and thereby cancelling the induction of the varying magnetic flux and so eddy currents within the electrically conductive second component).

In the examples shown in FIGS. 1 and 2, this is achieved due to the presence of a conductive coil or coils 16 which is/are wound coaxially with the permanent magnet(s) 12. In other words, each permanent magnet extends along a radial axis and the coil or coils are wound about this radial axis. As can be seen in FIGS. 1 and 2, in some examples, each permanent magnet may comprise a coil or coils that is/are wound coaxially with it.

In order to cancel, or at least to reduce, the damping torque to close to zero, a current is sent inside the coils in a direction such that the magnetic flux created by the coil cancels the magnetic fields created by the permanent magnets 12, thus decreasing drastically, or cancelling completely the damping torque.

The examples shown in FIGS. 1 and 2 therefore provide a new mechanism, method and assembly for damping aerodynamic surfaces which is based on physical laws, wherein torque (and therefore damping) is generated even in case of power failure, and wherein the device does not require to be energized in order to produce the damping effect. It also does not rely on any electronics in order to create the damping effect and the means for cancelling/limiting the damping effect also requires very little electronics. This provides improved safety in comparison to known damping techniques which rely heavily on electronics or which may require power in order to produce damping.

The examples further provide the added advantage that the damping effect is disengageable. The damping torque may therefore be cancelled or reduced when the motor drives the load in motoring mode (e.g. by providing the opposing current in the conductive coils) in order to optimize the global efficiency and decrease the thermal losses.

In the examples shown in FIGS. 1 and 2, the torque generated by these damping assemblies and methods is related to the rotation speed in that increased rotational speed generates increased torque and decreased rotational speed generates decreased torque. The torque generated is produced in the opposite direction causing a damping effect.

The global behaviour of the damping mechanisms and assemblies described herein may therefore be described as being similar to the function of the mode valve of an electro-hydraulic actuator.

For example, when the command voltage is applied to the solenoid valve driving the spool of the mode valve of an electro-hydraulic actuator, the mode valve switches to active mode, and no damping effort is generated. With the damping assemblies described in relation to FIGS. 1 and 2, when the command voltage is applied to the coils wound coaxially with the permanent magnets, the generated magnetic field created cancels out the magnetic fields of the permanent magnets and so no torque, or damping is generated.

When the mode valve control voltage is released for an electro-hydraulic actuator, the mode valve switches to damping mode under operation of a spring and the fluid is forced to pass through a flow restriction. With the examples described herein with reference to FIGS. 1 and 2, when the damping cancelation voltage is released or lost, the varying magnetic flux once again goes through the conductive rotary sleeve, thereby producing the damping effect.

Fitting damping assemblies such as those described herein inside a mechanical or electromechanical device having moving aerodynamic surfaces (e.g. a motor or actuator) in order to achieve the damping function is quite as safe as the damping feature on hydraulic actuators.

The examples described herein further avoid oversizing the driving torque of the motor as would be the case if the damping was obtained with a sleeve or any other non-disengageable means.

In addition to this, providing a motor with less torque means that the motor is lighter and draws less current. This in turn reduces the weight of the power drive electronics and eventually optimizes the weight of the complete actuator.

The invention claimed is:

1. A disengagable damping assembly for use in a device having moving aerodynamic surfaces comprising:
   a first component comprising a back iron and at least one permanent magnet, said at least one permanent magnet providing a first magnetic field, and;
   an electrically conductive second component,
   said electrically conductive second component and said first component being positioned coaxially about a central axis with said at least one permanent magnet being positioned between said back iron of said first component and said electrically conductive second component ; the assembly further comprising:
   means for rotating one or both of said at least one permanent magnet of said first component and said electrically conductive second component about said central axis to cause relative rotational movement between the at least one permanent magnet and second component, to thereby induce a variable magnetic flux in said electrically conductive second component and cause eddy currents to develop therein; and
   means for cancelling said first magnetic field of said at least one permanent magnet to thereby disengage the damping assembly, said means for cancelling said first magnetic field of said at least one permanent magnet comprises:
      at least one conductive coil wound coaxially with said at least one permanent magnet; and
      means for causing a current to flow through said at least one conductive coil, to create a second magnetic field that is opposite to said first magnetic field of said at least one permanent magnet, to thereby cancel the first magnetic field of said at least one permanent magnet.

2. The damping assembly of claim 1, wherein said at least one permanent magnet extends along a radial axis from said back iron of said first component in the direction of said electrically conductive second component.

3. The assembly of claim 1 wherein said back iron of said first component is ring-shaped and said second component is positioned within said ring-shaped back iron and wherein
   said at least one permanent magnet extends along a radial axis inward from an inner circumferential surface of the back iron and towards an outer circumferential surface of the electrically conductive second component.

4. The assembly of claim 1 wherein said at least one permanent magnet extends from said back iron along a radial axis; and wherein
   said means for cancelling said first magnetic field comprises:
   at least one conductive coil, wound about said radial axis; and
   means for causing a current to flow through said at least one conductive coil, to create a second magnetic field that is opposite to said first magnetic field of said at least one permanent magnet, to thereby cancel the first magnetic field of said at least one permanent magnet.

5. The damping assembly of claim 1, wherein said assembly is connectable to said device to be damped via a shaft which extends along said central axis of rotation.

6. The damping assembly of claim 1, wherein said device to be damped comprises a motor and wherein said damping assembly is connectable to said motor via a shaft of said motor which extends along said central axis of rotation.

7. The assembly of claim 1, wherein said first component and said second component are ring shaped.

8. The damping assembly of claim 1, further comprising an air gap between the permanent magnets and the second component.

9. A disengagable damping assembly for use in a device having moving aerodynamic surfaces comprising:
   a first component comprising a back iron and at least one permanent magnet, said at least one permanent magnet providing a first magnetic field, and;
   an electrically conductive second component,
   said electrically conductive second component and said first component being positioned coaxially about a central axis with said at least one permanent magnet being positioned between said back iron of said first component and said electrically conductive second component; the assembly further comprising:

means for rotating one or both of said at least one permanent magnet of said first component and said electrically conductive second component about said central axis to cause relative rotational movement between the at least one permanent magnet and second component, to thereby induce a variable magnetic flux in said electrically conductive second component and cause eddy currents to develop therein; and means for cancelling said first magnetic field of said at least one permanent magnet to thereby disengage the damping assembly;

wherein said first component comprises a stator and said second component comprises a rotor body and wherein said means for rotating one or both of said at least one permanent magnet of said first component and said electrically conductive second component about said central axis to cause relative rotational movement between the at least one permanent magnet and second component comprises means for rotating said second component about said central axis.

10. The damping assembly of claim 9, wherein said assembly is connectable to said device to be damped via a shaft which extends along said central axis of rotation.

11. The damping assembly of claim 9, wherein said device to be damped comprises a motor and wherein said damping assembly is connectable to said motor via a shaft of said motor which extends along said central axis of rotation.

12. The assembly of claim 9, wherein said first component and said second component are ring shaped.

13. The damping assembly of claim 9, further comprising an air gap between the permanent magnets and the second component.

* * * * *